(12) United States Patent
Immonen et al.

(10) Patent No.: US 9,809,687 B2
(45) Date of Patent: Nov. 7, 2017

(54) PROCESS FOR MANUFACTURING A THERMOFORMABLE PLASTICIZED COMPOSITE CONTAINING CELLULOSE FIBER AND A MOLDABLE POLYMER

(75) Inventors: Kirsi Immonen, Tampere (FI); Eino Sivonen, Tampere (FI); Kyosti Valta, Tampere (FI); Janne Hulkko, Espoo (FI); Samu Aalto, Espoo (FI); Pauliina Pitkanen, Espoo (FI); Kirsi Salorinne, Espoo (FI)

(73) Assignee: TEKNOLOGIAN TUTKIMUSKESKUS VTT OY, VTT (FI)

( * ) Notice: Subject to any disclaimer, the term of this patent is extended or adjusted under 35 U.S.C. 154(b) by 0 days.

(21) Appl. No.: 14/000,882

(22) PCT Filed: Mar. 5, 2012

(86) PCT No.: PCT/FI2012/050217
§ 371 (c)(1),
(2), (4) Date: Aug. 22, 2013

(87) PCT Pub. No.: WO2012/117165
PCT Pub. Date: Sep. 7, 2012

(65) Prior Publication Data
US 2013/0331518 A1 Dec. 12, 2013

(30) Foreign Application Priority Data
Mar. 3, 2011 (FI) .................................... 20115218

(51) Int. Cl.
| | | |
|---|---|---|
| C08J 3/18 | (2006.01) | |
| C08J 5/04 | (2006.01) | |
| C08L 1/28 | (2006.01) | |
| C08L 67/04 | (2006.01) | |
| C08L 97/02 | (2006.01) | |
| B29C 45/00 | (2006.01) | |
| B29C 47/00 | (2006.01) | |
| B29C 70/06 | (2006.01) | |
| C08G 63/91 | (2006.01) | |
| B29B 9/14 | (2006.01) | |
| B29B 9/16 | (2006.01) | |

(52) U.S. Cl.
CPC ............ *C08J 3/18* (2013.01); *B29C 45/0001* (2013.01); *B29C 47/0007* (2013.01); *B29C 70/06* (2013.01); *C08G 63/912* (2013.01); *C08J 5/045* (2013.01); *C08L 1/28* (2013.01); *C08L 67/04* (2013.01); *C08L 97/02* (2013.01); *B29B 9/14* (2013.01); *B29B 9/16* (2013.01); *C08J 2367/04* (2013.01); *C08J 2401/28* (2013.01); *C08J 2421/00* (2013.01); *C08J 2471/02* (2013.01); *C08J 2491/00* (2013.01); *C08J 2491/06* (2013.01); *C08L 2205/08* (2013.01); *C08L 2205/16* (2013.01)

(58) Field of Classification Search
CPC . C08J 3/18; C08J 5/045; C08J 2401/28; C08J 2367/04; C08J 2421/00; C08J 2471/02; C08J 2491/00; C08J 2491/06; C08G 63/912; B29C 45/0001; B29C 47/0007; B29C 70/06; C08L 1/28; C08L 67/04; C08L 97/02; C08L 2205/08; C08L 2205/16; B29B 9/14; B29B 9/16
USPC ..... 264/141, 157, 299, 319, 331.12; 524/35; 525/54.2, 54.21, 410, 415, 450
See application file for complete search history.

(56) References Cited

U.S. PATENT DOCUMENTS

| | | |
|---|---|---|
| 2007/0270527 A1 | 11/2007 | Horie et al. |
| 2008/0161502 A1 | 7/2008 | Bartnick |
| 2009/0229771 A1 | 9/2009 | Warnes et al. |
| 2009/0258971 A1* | 10/2009 | Heiskanen et al. ............. 524/14 |
| 2009/0326082 A1 | 12/2009 | Cernohous |
| 2010/0004358 A1* | 1/2010 | Hashiba ......................... 524/13 |

FOREIGN PATENT DOCUMENTS

JP 2003119391 A 4/2012

OTHER PUBLICATIONS

Giles et al; Extrusion: The Definitive Processing Guide and Handbook, 2005, p. 331-339.*
Yoshida et al; Journal of Energy and Power Engineering, 2013, p. 705-710.*
Immonen, K., et al.; Industrial Biomaterials Research Highlights, 2011, p. 51-63.*
Takatani, M., et al.; Journal of Wood Science, 2008, p. 54-61.*

* cited by examiner

*Primary Examiner* — Robert Jones, Jr.
(74) *Attorney, Agent, or Firm* — Thorpe, North & Western, LLP; Christopher Johnson (57) ABSTRACT

The present invention concerns a process for manufacturing a thermoformable plasticized composite containing cellulose fiber and polylactide by blending the dry cellulose fiber and a compatibilizer in a compactor into pellets, and subsequently reacting the reactive compatibilizer and the mixture of cellulose fiber and polylactide by compounding. The invention also concerns a composite manufactured using said process, as well as further processed products.

17 Claims, 5 Drawing Sheets

PROCESS FOR MANUFACTURING A THERMOFORMABLE PLASTICIZED COMPOSITE CONTAINING CELLULOSE FIBER AND A MOLDABLE POLYMER

BACKGROUND OF THE INVENTION

Field of the Invention

The present invention concerns a process for manufacturing a thermoformable plasticized composite containing cellulose fiber and polylactic acid (PLA), as described in the preamble of claim 1, which composite has an improved impact strength.

Description of Related Art

Natural fibre and cellulose based biocomposite and natural fibre composite (NFC) materials, as well as their use in replacing plastic products, have been under intensive study for over a decade due to several reasons, e.g. the renewable character of these raw materials, the low weight of the composites, the low price of fibres compared to plastics, the new product properties compared to plastics, the end product image and the new product possibilities for these cellulose materials.

When looking for new product possibilities for cellulose fibre, one natural way is to go towards a mouldable fibre web or towards composite materials with high fibre contents, which materials are thermally mouldable. Those materials allow the direction towards plastic-type products, such as packaging materials, having high mouldability to shapes and forms completely new for materials with a high cellulose content.

One challenge in combining highly hydrophilic cellulose and hydrophobic polymeric materials is a poor adhesion, which restrict film forming properties and gives low impact strength for these materials. The use of cellulose in biocomposites requires some kind of plasticization. However, the use of typical plasticizers (e.g. non-bonded plasticizer systems) often deteriorates temperature resistance, impact resistance, water absorption properties and they have a tendency to migrate on the material surface.

Reactions to cellulose are normally done using different solvent processing methods, those are often time, energy and solvent consuming.

One of the most critical properties of polylactide-based biocomposites is their impact strength. However, for example composites of polylactide and cellulose fibers have typically been quite fragile, with low impact strengths.

In most prior solutions for forming thermoformable plasticized fiber products, the fiber is modified or mixed into a water/solvent suspension, whereby no reactive components, such as anhydrides, can be attached to the surface of the product without losing its reactivity.

On the other hand, these prior products have had extremely low fiber contents (about 10%).

Thus, there is a need for methods that make it possible to manufacture products with high fiber contents, particularly high contents of cellulose fiber, which products exhibit good mouldability and high impact strengths, thus making them suitable for use in replacing plastic products.

SUMMARY OF THE INVENTION

It is an object of the present invention to provide moldable high-strength biocomposites with high cellulose contents, as well as processes for manufacturing them.

Particularly, it is an object of the present invention to provide means for manufacturing thermoformable plasticized cellulose composites with high impact strengths.

A further object of the invention is to provide an enhanced compatibility of cellulose with biopolymers, thus making it possible to produce materials suitable for thermally moulded applications (film extrusion, thermal mould forming and injection moulding).

These and other objects, together with the advantages thereof over known processes and composites, are achieved by the present invention, as hereinafter described and claimed.

The raw-materials and additives used in the present invention provide a novel replacement product for plastics, which is based on renewable raw-materials and improves one of the most critical properties of, especially PLA-based biocomposites, i.e. the impact strength.

The present invention concerns a process for manufacturing a thermoformable plasticized composite containing cellulose fiber and polylactic acid (PLA).

More specifically, the process of the present invention is characterized by what is stated in the characterizing part of claim 1.

Further, the composite of the present invention is characterized by what is stated in the characterizing part of claim 12.

Considerable advantages are obtained by means of the invention. Thus, the present invention provides one approach for obtaining thermoformable packaging alternatives based on cellulose and other natural materials that the packaging industry has been searching for.

The present process makes it possible to utilize cellulose fiber in thermoformable materials and materials manufactured using processes common in the plastics industry. Using the manufacturing process according to the invention, no solvents are required in the processing, while, among others, water would function as a component interfering with the reactivity when attaching the compatibilizer (such as the plasticizer) to the fiber/polymer.

Further, a fiber content of up to 30% has been achieved in the composites, while the content of epoxide or anhydride functional compatibilizers was up to 7.5%. Compared to earlier attempts, the maximum amount of fiber has been 10%.

The invention also provides a new type of solution for increasing the strength of composites containing polylactide (PLA) and cellulose fibers, which composites typically have been fragile, particularly with a low impact strength.

These composites have an improved impact strength compared to these prior products. By using suitable compatibilizers in the composites, and by attaching these compatibilizers to said composites with the help of dry compacting and, optionally reactive extrusion, a significant increase in the impact strength of the products of 92-106% could be obtained.

The problems relating to, among others, temperature resistance, impact resistance, water absorption properties and migration have been avoided by cross-linking the cellulose and the compatibilizer and/or coupling to the polymer, or alternatively by an improved dispersion.

By using dry compacting method it is possible to add compatibilizers and reactants to either moist or dry cellulose fibre before processing it reactively in plastic processing equipments such as compounders in aim to get good compatibility to polylactide (PLA). These dry processing methods can be the way to introduce equivalent amounts of reactants to cellulose enabling and also moisture sensitive reactants.

The mentioned dry compacting method is also environmentally friendly.

Next, the invention will be described more closely with reference to the attached drawings and a detailed description.

DETAILED DESCRIPTION OF THE PREFERRED EMBODIMENTS OF THE INVENTION

The present invention concerns a process for manufacturing a thermoformable plasticized composite containing cellulose fiber and a moldable polymer, such as polylactic acid (or polylactide, PLA), which process includes the steps of dry compacting and reactive compounding, e.g. by extrusion, particularly in the pre-treatment of the starting material.

The moldable polymer will in the following be referred to as polylactic acid or polylactide (PLA), which is a preferred moldable polymer. However, other suitable polymers include polyethylene, polypropylene, polyhydroxyalkanoates, thermoplastic polyesters and polyamides, as well as other thermoplastic and polymers processable in temperatures below 220° C.

Generally, the process of the invention can include also other processing steps than dry compacting and compounding by extrusion, such as injection moulding or thermal mould pressing.

The used starting material is preferably a mixture containing natural cellulose fiber, to which material polylactide has been added. The natural fiber can be obtained from any pulp containing cellulose fiber, for example any wood pulp, such as birch pulp.

According to an embodiment of the invention, suitable raw-materials also include other cellulose-containing plant material, such as wood from softwood trees, e.g. spruce, pine, fir, larch, douglas-fir or hemlock, or wood from hardwood trees, e.g. birch, aspen, poplar, alder, eucalyptus or acasia, or non-wood materials, such as agricultural residues, or grasses, straw, leaves, bark, seeds, hulls, flowers, vegetables or fruits from materials, such as cotton, corn, wheat, oat, rye, barley, rice, flax, hemp, manila hemp, sisal hemp, jute, ramie, kenaf, bagasse, bamboo or reed. These can be used as such or as mixtures of two or more of these mentioned wood or non-wood raw-materials. These can optionally be processed prior to use by, for example, mechanical, chemimechanical or chemical pulping, more particularly by, e.g., refiner mechanical pulping (RMP), pressurized refiner mechanical pulping (PRMP), thermomechanical pulping (TMP), groundwood (GW) or pressurized groundwood (PGW) or chemithermomechanical pulping (CTMP).

The process can be operated at a dry-matter content of above 30%, whereby the fiber content preferably is between 20 and 50%, of the weight of the composite. Particularly, the fiber content is about 30% calculated from the weight of the composite.

The used cellulosic raw-material can optionally be pre-treated, particularly by tearing the material into smaller pieces, e.g. using a blade mill.

The essential part of the invention is the addition of a "compatibilizer", which term is intended to include particularly plasticizers (internal or external), but also dispersing agents and cross-linkers. These agents provide a good dispersion of the fiber into the polylactide and an attachment either to the fiber or to the polymer. The dry compacting, in turn, provides the possibility to add the compatibilizer in a reactive form prior to the compounding process.

The dry compacting is used to blend a reactive compatibilizer into the mixture of natural fiber in as dry conditions as possible, preferably in a dry-matter content of 55-99.9%. During the extrusion, said compatibilizer is attached to the fiber. A portion of the compatibilizer can also be linked to the polylactide.

The reactive compatibilizer is preferably selected from long-chained (≥C8) linear or branched organic compounds containing epoxy or anhydride functionalities, particularly aliphatic compounds, for example octenyl succinic anhydride, natural epoxy rubber or tall oil derivatives. Other suitable alternatives include functionalised vegetable oil/tall oil based plasticizers, functionalised natural rubber, polyols and cellulose and silicone derivatives containing anhydride, epoxy, hydroxyl or double bond functionalities.

Based on the results obtained in the below examples, compatibilizers having epoxy and anhydride functionalities (particularly epoxides) are particularly advantageous for the purposes of the present invention. Also polyols and organosilicates are advantageous.

Particularly preferred compatibilisators for use in the present invention are the TOFA anhydride, the TOFA (ester) epoxide and the Cardanol epoxide described in the below Table 1.

The compatibilizers were used in contents of 1 to 10 weight-%, for example about 7.5%, or about 2%, calculated from the weight of the composite.

These reactive compatibilizers suitable for use in the invention can thus contain, for example, epoxy functionalities and be formed from some plant oil. Preferably, they are plasticizers, and generally based on the modification of tall oil or a plant-based cardanol.

The substances used in the product of the present invention are mainly based on renewable raw-materials, and improve one of the most critical properties of PLA-based biocomposites, i.e. the impact strength. This function is based on the composite being manufactured using dry compacting (in as dry conditions as possible) and methods for the reactive processing of plastics.

According to an embodiment of the invention, the method for manufacturing the plasticized composite of cellulose fiber and PLA includes two stages. In the first stage, the dry cellulose fiber and the compatibilizer are blended and pressed (by compacting) into pellets, for example using the dry compactor according to FI20106340.

Optionally, this stage can be preceded by an initial stage, wherein compatibilizers, such as plasticizers or dispersing agents, are introduced to the fibres by spraying them onto the fibre surface in amounts of 3 to 25% of the fibre content, preferably about 10%.

Preferably, the fibre pellets are then dried in oven at mild temperatures, preferably exceeding room temperature, such as temperatures of 40-60° C., e.g. about 45° C.

In the second phase, the compatibiliser, such as the reactive plasticizer, and the mixture of cellulose fiber and PLA are reacted in a compounding process, such as an extrusion process, to combine them. Optionally, the reaction can at least partly occur already during the compacting stage.

The mentioned compactor (of FI20106340) is a so-called e-compactor, which is a type of modified pelletizing equipment, which can be used as a pre-treatment technology for several kinds of organic materials.

A compactor, in general, is a type of equipment that is used to increase the specific weight of the biomaterial, specifically by compounding, mixing and homogenizing the material. Such compactors are commonly used in the feed, food and mining industries, as well as in the manufacture of energy pellets, and in the compacting of waste plastic into granulate. Compacting such materials into pellets is advantageous, among others since the pellet shape is easily fed into common plastic processing equipment.

The e-compactor described in FI20106340 functions by an angular roller of the compactor pressing the material to be processed against a perforated pan plate, whereby more material is continuously pressed through the holes of the plate.

Figure 9:
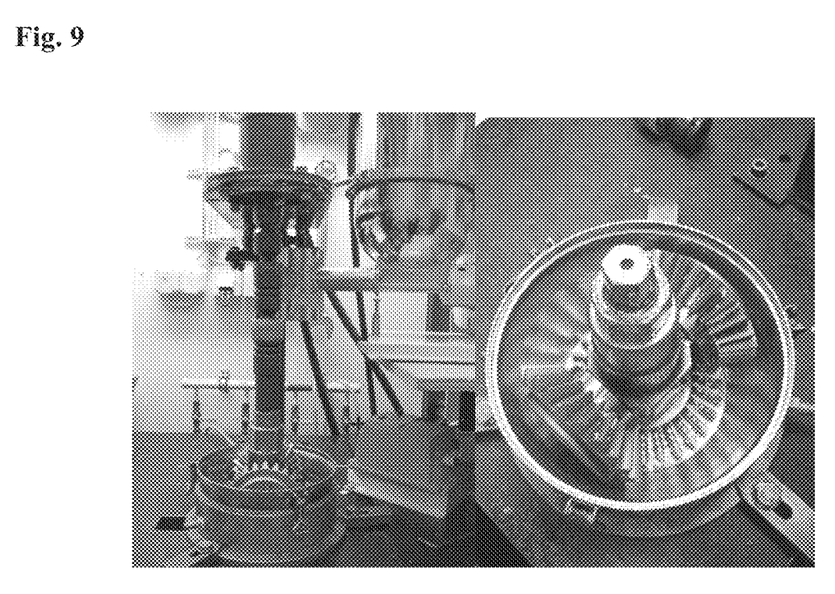
FIG. 9 is a photograph of a laboratory-scale e-compactor that can be utilized in the process of the present invention.

Thus, according to an embodiment of the present invention, the process includes the steps, wherein biomaterial, such as the above described cellulose/PLA mixture containing compatibilizer, is pressed through the openings in a perforated pan plate of a compactor, such as the one described in FI20106340, with the help of the rollers of a roller mill (see FIG. 9), whereby both the pressure and the temperature of the material is increased, and the material is pressed into pellets. The advantages of such a compactor compared to other types of equipment include a reduced amount of friction between the rollers and the plate (or the biomaterial and the plate), and a remarkably improved delivery of material, and a reduced incidence of interruptions (e.g. due to the cleaning of clogged equipment). Thus, the overall function of the present process is improved using said compactor, and the range of materials that can be processed is increased (here including also dry and slippery materials), and the compatibilizer can be added in an earlier stage compared to prior processes.

According to an embodiment of the invention, the holes of the perforated pan plate of the compactor have a diameter of 1-5 mm, particularly about 3 mm.

In the process of the present invention, the biomaterial is pressed through said openings of said compactor one or more times, particularly 1-10 times, preferably 2-10 times. Many materials have been found to require compacting more than one time (in more than one cycle), particularly 5-10 times, e.g. 10 times, which pressing can be carried out as a continuous process using sequential compactors. The optimum exact number of compacting cycles, however, depends on the type of biomaterial used (e.g. the size of the lumps or particles contained in it). It is, however, preferred to minimize the number of cycles.

During the compacting, the temperature of the biomaterial is slightly increased, with a maximum temperature being about 70° C., said increased temperature further activating the optionally added chemicals.

Each compacting cycle causes a further increase of the temperature, whereby, according to an embodiment of the invention, the number of cycles can be increased up to 20, with monitoring of the temperature. Generally, the number of cycles is minimized and can be selected according to the lump/particle size of the raw-material, preferably with a more homogenous pulp subjected to 1-5 cycles, or 1-2 cycles, and with chips, husks and other types of non-homogenized (e.g. long-fiber) materials subjected to 5-10, or even 5-20, cycles.

Also, the compactor creates local and transient high pressure, shear and elongational deformations in the material system together with a high temperature gradient. In fact, the advantages of the invention include the possibility to process the biomaterial at low temperatures, low pressures and during short/limited periods of time. This also generates and maintains useful chemical reactions, such as the reaction between compatibilizers and the cellulose/PLA mixture of the invention.

The process keeps said biomaterial relatively dry, since the used compactor is capable of degrading and fibrillating the fibers of the biomass without the presence of added solvent. Thus, the process and the equipment are operated at a dry-matter content of above 30%, preferably 55.0-99.9%.

Preferably, the above-mentioned high dry-matter content is achieved without the use of any added solvent, i.e. with all the solvent in the material to be compacted being traceable to the moisture of the raw-material and any solvent of the optional further chemical(s), since fresh wood already can contain about 50% by weight of water.

The whole processing procedure is conducted in as dry conditions as possible using this mechano-chemical processing method and common plastic processing equipments.

The product of the invention is a composite that can be further processed, e.g. by melt-processing, either into a film or into extrusion or injection molded pieces.

Thus, the biocomposite product, having an excellent impact strength, also provides new application possibilities for biocomposites, and can be used for example in the products of the packaging and injection molding industries.

The following non-limiting examples are intended merely to illustrate the advantages obtained with the embodiments of the present invention.

EXAMPLES

Example 1

Materials of the Invention

The polymeric matrix material used in this example was PLA 2002D (NatureWorks), which is a polylactide tailored for film purposes. The used fiber material was birch pulp (VTT/KCL), which was torn to pieces from a sheet using a blade mill with 15 mm holes. Several reactive compatibilizers having different functionalities were tested as compatibilizers in the composites, these compatibilizers including different epoxides, anhydrides, hydroxyl functions, double bond (ketene) functions and dispersants. Some materials and their functionalities are presented in Table 1.

TABLE 1

Reactive compatibilizer or cross-linkers used in PLA- birch pulp composites.

| Compatibilizer | Code | Producer | Functionality | Other |
|---|---|---|---|---|
| Arcol polyol 1110-1 | OH1 linear | Bayer | OH-value 110 | PP polyether polyol |
| Cardura E10P | E1 branched | Hexion | Epoxide value 4100-4250 mmol/kg | $C_{13}H_{24}O_3$ Glysidyl ester of neodecanoic acid |
| Desmophen 10WF15 | OH2 tri | Bayer | OH-value 33-37 | Trifunctional polyether polyol |
| ENR50 | E2 elastomer | Weber-Schaer GmbH | Epoxy degree 50% | Natural rubber |
| Epicote 877 | E3 di | Hexion | Epoxy eqv. 310-340 g/eq. 2940-3225 mmol/kg | Difunctional aliphatic diglycidyl ether |
| Ethocell 100 | EOx | Dow | Ethoxyl content 48-49.5% | Ethyl cellulose, high viscous |
| Heloxy 505 | E4 oil | Hexion | Epoxy eqv. 500-640 g/eq. 1538-2000 mmol/kg | Polyglycidyl ether of castor oil |
| Hydrores 364MP (AKD) | DB | Kemira | Alkyl ketene dimer, double bond | Cationic wax, cellulose hydrophobisation |
| Hydrores AS3100 (ASA) | A1 | Kemira | Anhydride | Alkenyl succinic anhydride |
| OSA | A2 | Pentagon Chemicals | Anhydride | Octenyl succinic anhydride |
| Polyox WSR N750 | PEOx | Dow | Dispersant/plasticizer | Nonionic poly(ethylene oxide) |
| Silikopon EP | E5 Si | Tego Chemie | Epoxy eqv. 450 g/eq | Silicone epoxy ester |
| Dynasylan GLYEO | GOx | Dynasylan | Silanol and glycidyl | 3-glycidyloxypropyl-triethoxysilane |
| TOFA anhydride | A3 VTT tall oil | VTT | Anhydride | Modified tall oil |
| TOFA epoxide | E6 VTT tall oil | VTT | Epoxide | Modified tall oil ester |
| Cardanol epoxide | E7 VTT cardanol | VTT | Epoxide | Modified cardanol oil |

The compatibilizers were selected according to their ability either to react with or attach to the cellulose fiber surface, and thus modify the surface properties by working as cross-linkers between the cellulose and the matrix polymer or by improving the dispersion ability of the cellulose fibers to the matrix polymer.

The preparation of the TOFA and Cardanol compatibilizers was achieved by chemical modification using TOFA (tall oil fatty acids) and cardanol as the raw materials (Scheme 1).

Scheme 1. Main components of TOFA (for 2) and cardanol.

TOFA

Cardanol

The functionalization of TOFA and cardanol was targeted to the various double bonds, which were transformed into epoxides and/or anhydrides (1-3, Scheme 2-3). The epoxidation was achieved by using either 3-chloroperbenzoic acid (mCPBA) or peracetic acid as the epoxidizing agent with excellent to good yields (>80%). In the case of TOFA, an ester derivative (TOFA 2-ethyl hexanoate) was used as the starting material. A ~100% conversion of the double bonds into epoxy groups was obtained with TOFA, whereas, only ~75% conversion was reached with cardanol.

Scheme 2. Average structures of TOFA 2-ethyl hexanoate (1) and cardanol (2) epoxides.

The anhydride functionalization for TOFA was done by using an alkyd base (TOFA, pentaerythtritol and isophthalic acid in a weight ratio of 1,0:0,19:0,15) and anhydride modified TOFA (TOFA and maleic anhydride in weight ratio 1:0,3). The mixture was reacted to get the polymeric product with reactive anhydride groups.

Scheme 3. Anhydride modified TOFA alkyd (3)

Malenized hybrid resin

In the first stage of the dry processing the compatibilizer-containing fibre mass (obtained by blending cellulose with the compatibilizer) was pressed through a modified pelletizing equipment (the e-compactor) to form compatibilizer-containing cellulose pellets, which are suitable for addition to an extruder.

The fibre pellets were then dried in oven at 45° C. and processed to fibre-polymer compounds containing 30-40% fibre-compatibilizer mixture.

The compacted dried fibre-compatibilizer pellets were compounded with PLA using Berstorff ZE 25×33 twin-screw extruder followed by injection moulding with the Engel 200/50HL to dog-bone-shaped test bars.

Some composites with 30% fibre content were also extruded to 10 cm wide sheets with Brabender one screw extruder followed by thermal mould pressing to 1 cm deep 7 cm diameter round shaped cup form. The thickness of the extruded sheets depended on extrusion parameters. The moulding process was carried out in about 3 min, pressing the sheets in a mould at 185° C.

Generally, the processing was performed at a temperature below 200° C. for all the material combinations, and the whole processing procedure was conducted in as dry conditions as possible using mechano-chemical methods and plastic processing equipments.

Example 2

Analysis of the Composites

From these processed materials, tensile strength, impact strength and flexural strength properties as well as thermal behaviour (DSC) was analysed. Also film extrusion and mould processing properties were tested.

Tensile strength tests were conducted according to standard SFS-EN ISO 3167:2003 and flexural strength according to ASTM D790-02 using Instron 4505 and Charpy impact strength (unnotched) according to standard ISO179. The interactions between fibre, compatibilizer and polymer were checked using DSC (TA Instruments model MDSC2920) and dissolving PLA-matrix out. Preferably, the dissolving was carried out into dichloromethane at 39° C., whereafter the residual fibre was weighted.

Figure 1:
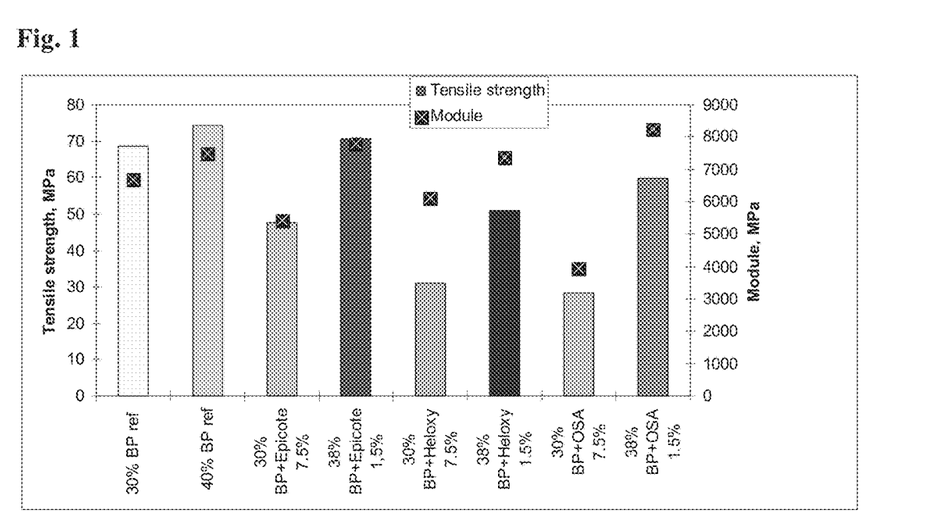
FIG. 1 shows the tensile strength results for PLA-birch pulp composites with compatibilizer amounts of 1.5% and 7.5%, whereby the first mentioned composite contained 30% fibre and the latter 38% fibre.
Figure 2:
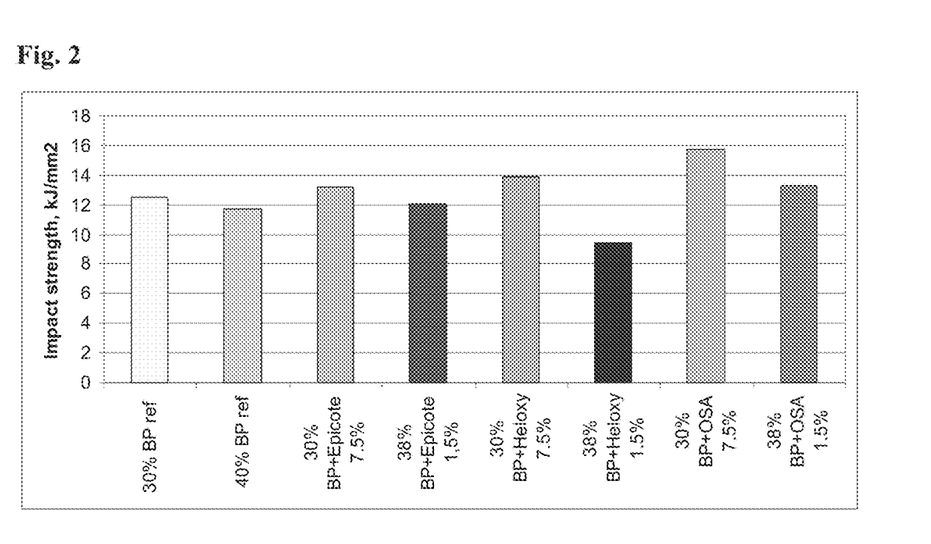
FIG. 2 shows the impact strength results for PLA-birch pulp composites with compatibilizer amounts of 1.5% and 7.5%, whereby the first mentioned composite contained 30% fibre and the latter 38% fibre.

The results for tensile and impact strength with some compatibilizers (in amounts of 1.5% and 7.5%) are presented in FIGS. 1 and 2.

The tensile strength and toughness was best retained with epoxy functional compatibilizers Silikopon, Cardura and Epicote and materials mainly with dispersion/plasticizing ability. With double bond functionality (Hydrores AKD) and epoxide functional Heloxy, the module stayed in almost original level regardless of an over 50% drop in the tensile strength indicating quite a rigid material. The strain results showed an increase in the strain at break with compatibilizers such as Arcol polyol and Desmophen, all epoxide functionalities and OSA.

These materials, except the TOFA and Cardanol epoxides, also had a clear difference between the strain at max strength and the strain at break. This indicates that there is some cross-linking either by covalent or hydrogen bonding between the polymer, the compatibilizer and the cellulose. Mainly dispersing compatibilizers did not have any effect on strain, although this dispersing effect is sufficient for at least some purposes of the invention, since the tensile and impact strengths are most important. Hydrores ASA and AKD had a clearly negative effect on the strain, which dropped over 50% compared to the reference, without improving the tensile strength properties.

More specifically, according to FIG. 1, the module of epoxy functionality containing Epicote and Heloxy stayed quite high (20-40% drop) even though the drop in tensile strength was quite significant (30-60%) with the higher compatibilizer amount 7.5%. In FIG. 2, in turn, it can be seen that the impact strength increase was higher, 6-20%, with the higher compatibilizer amounts.

Figure 3:
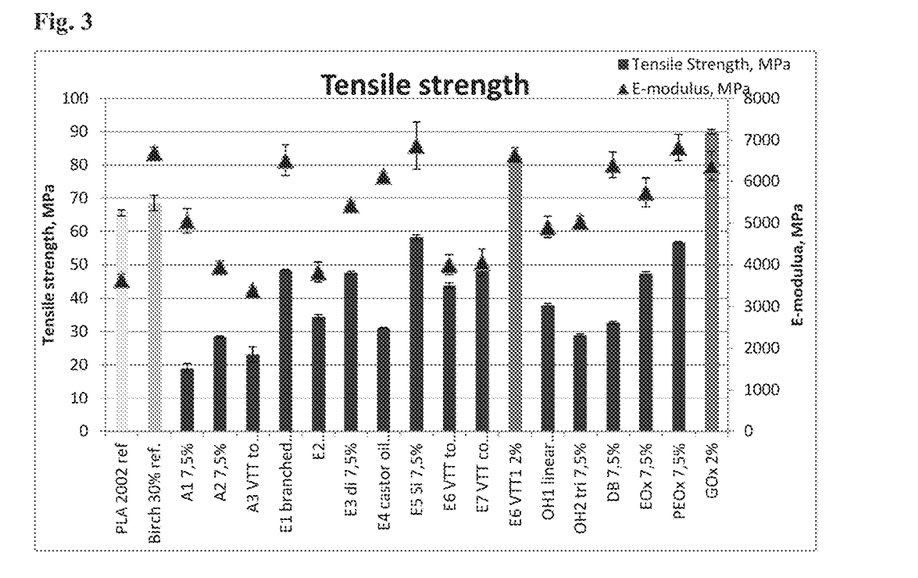
FIG. 3 shows the tensile strength results for PLA-birch pulp composites containing 7.5% compatibilizer and 30% fibre.
Figure 4:
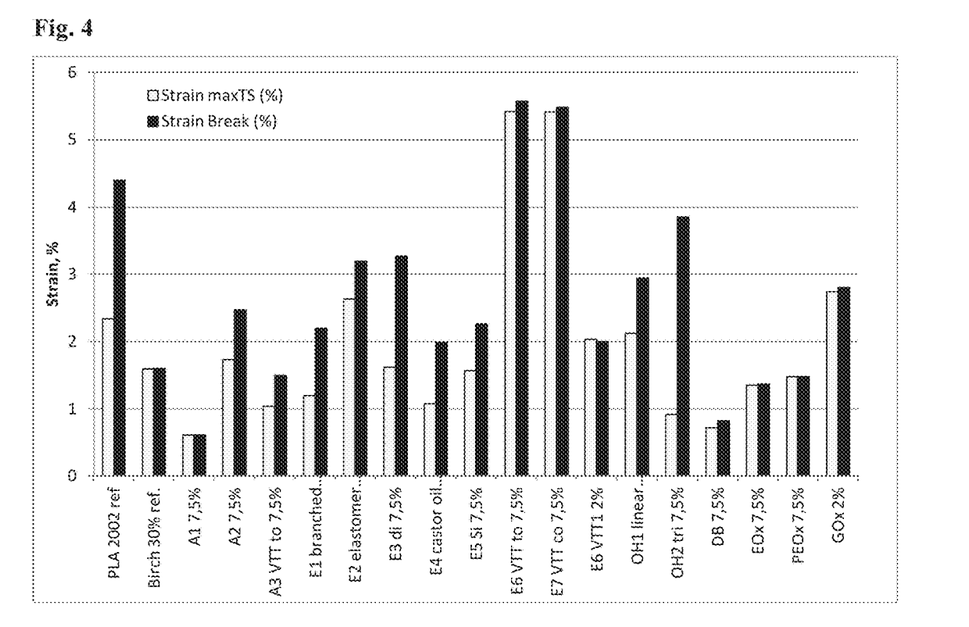
FIG. 4 shows strain results in a tensile strength test for PLA-birch pulp composites containing 7.5% compatibilizer and 30% fibre.
Figure 5:
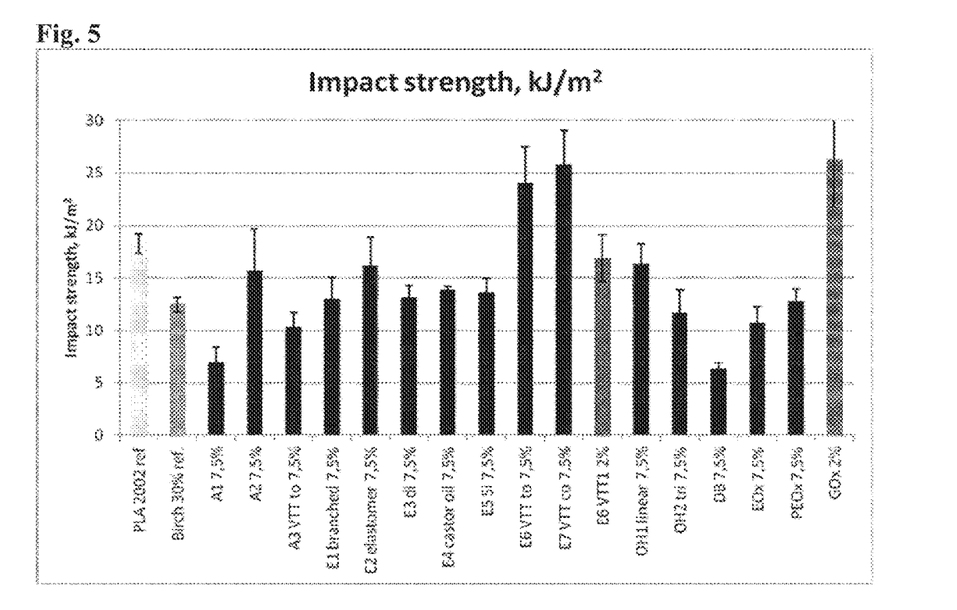
FIG. 5 shows the impact strength results for PLA-birch pulp composites containing 7.5% compatibilizer and 30% fibre.
Figure 6:
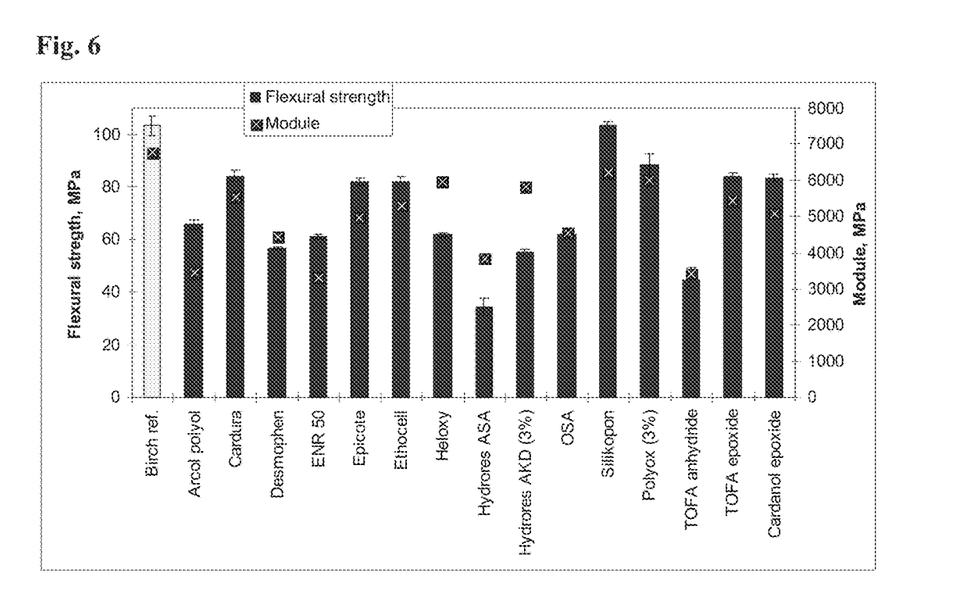
FIG. 6 shows the flexural strength results for PLA-birch pulp composites containing 7.5% compatibilizer and 30% fibre.

The tensile strength results for all tested compatibilizers are combined in FIGS. 3 and 4, the impact strength results in FIG. 5 and the flexural strength results in FIG. 6. Results from a thermal test with DSC are presented in Table 2. Visual estimate results from film extrusion followed by thermal mould extrusion are presented in Table 3.

Based on the results in FIG. 3, the tensile strength and toughness was best retained with Dynasylan and the epoxy functional compatibilizers Silikopon, Cardura and Epicote and materials with dispersion/plasticizing ability, Polyox and Ethocell. Tensile strength properties of over 50% together with a high (over 40%) drop in module was achieved with anhydride functional TOFA anhydride and OSA as well as epoxide functional ENR50. With Hydrores AKD and epoxide functional Heloxy the module stayed in almost original level regardless of an over 50% drop in the tensile strength, indicating quite a rigid material.

Strain results in FIG. 4 showed an increase in strain at break in composites of a 30% fibre-content, with compatibilizers such as OH-functional Arcol and Desmophen, epoxy functional Tofa epoxide, Cardanol epoxide, ENR50, Epicote, Cardura, Silikopon and Heloxy as well as anhydride functional OSA. These materials, except Tofa and Cardanol epoxide (and EOx and PEOx), had also a clear difference between strain at max strength and strain at break, which results are almost the same for the reference material (1.59% and 1.6%). In pure PLA2002D these values are 2.3% and 4.4%. This indicates that there is some cross-linking by either covalent or hydrogen bonding between the polymer, the compatibilizer and the cellulose. The compatibilizers Ethocell and Polyox were able to act mainly as dispersing agents, and did not have any effect on strain. The compatibilizers Hydrores AKD and Hydrores ASA are normally used in paper sizing and clearly had a negative effect on strain, which dropped over 50% compared to the reference, without improving the tensile strength properties.

The impact strength results in the composites containing 30% cellulose fibre showed a clear increase with some compatibilizers. More specifically, the impact strength results presented in FIG. 5 are showing that effect of compatibilizers manufactured according to Example 1, such as epoxy functional tall oil and vegetable oil based compatibilizers, provided the highest impact strength increase (92-106%), which is quite a significant increase.

With anhydride functional octenyl succinic anhydride (OSA), the impact strength was increased by 25% and with hydroxyl functional polyol and epoxy functional natural rubber by about 30%. Also Dynasylan gave an improved impact strength already with a content of 2% of the composite. Paper sizing chemicals Hydrores AKD and Hydrores ASA caused a 50% and 45% drop to impact strength results respectively. Other compatibilizers had no significant effect on impact strength results.

The flexural strength results in FIG. 6 showed no improvement due to compatibilizers and the results do resemble a lot the tensile strength results in the compatibilizer effect point of view. The highest results in strength and module were obtained with epoxy functional Silikopon, which had the same strength value (103 MPa) and only about 8% lower module value (6217 MPa) compared to the reference without compatibilizers. Next best was Polyox with 15% lower strength value and 12% lower module value. Then followed a series of epoxy functional compatibilizers Cardura, Epicote, Tofa epoxide and Cardura epoxide and dispersant Ethocell, which all had about 20% reduced flexural strength values (82-84 MPa) and module from 5000-5500 MPa. The highest drop was obtained with Hydrores ASA to strength value 34.4 MPa and module 3842 MPa.

According to the DSC results, reactions between polymer-compatibilizer-cellulose had clearly occurred in materials containing epoxy functionality, anhydride functionality and compatibilizers with high OH-values, which explains also the improved strain at break values compared to the reference material, but also the existence of elongation at yield strain in those materials. This elongation at yield strain or difference between strain at break and strain at max strength seems to correlate also to sheet extrusion and mouldability properties of these composite materials.

Extrusion or moulding processes were not optimized to any of these materials separately, but only for comparative purposes. Results of sheet extrusion and moulding process in correlation to yield strain results are presented in Table 3 and FIG. 8. In addition, in FIG. 7 is presented a correlation of the mouldability to the strain results in the tensile strength test.

Figure 7:
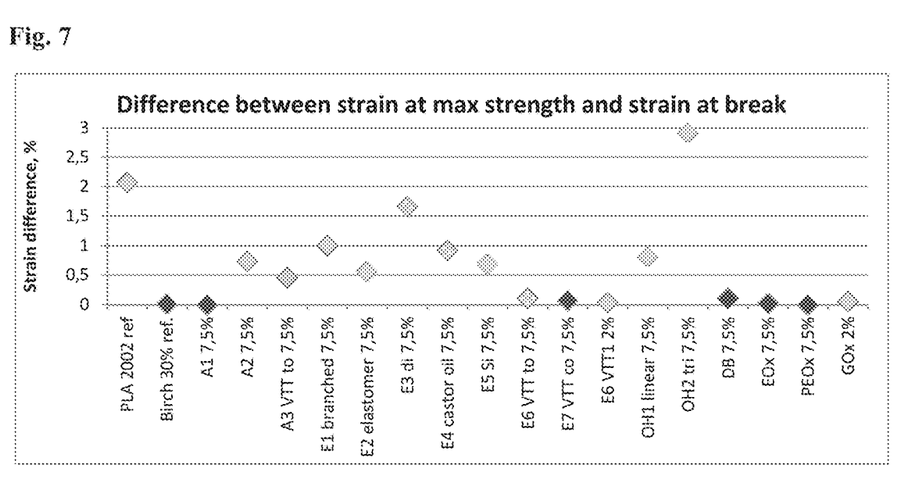
FIG. 7 shows the correlation between the mouldability of PLA-fibre composites (fibre content 30%) and the difference of the strain in max strength to the strain in break during a tensile strength test, whereby the red points are not mouldable, the yellow point is mouldable in some extent, and the green points are mouldable to shapes.

According to the results in FIG. 7, the cellulose fibre containing material is at least mouldable to sheet form, and in best cases mouldable in thermal pressing, if it has clear yield strain. This yield strain in a material can be achieved through functional compatibilizers that are able to disperse fiber to polymer properly and/or able to form links between the fibre and the polymer either through covalent or hydrogen bonds.

TABLE 2

Results from differential scanning calorimetry (DSC) for PLA-birch pulp composites with a 7.5% content of compatibilizer and a fibre content of 30%.

|  | 1st Heating | | | Cooling | 2nd Heating | |
| --- | --- | --- | --- | --- | --- | --- |
|  | Tg, °C. | Tc, °C. | Tm, °C. | Tg, °C. | Tg, °C. | Tm, °C. |
| PLA 2002D ref | 57 | 121.9 | 148 | 54.4 | 57.5 | 151 |
| PLA + 30% Birch pulp ref | 56.3 |  | 145/152 | 54.7 | 57.1 | 147/153 |
| +OH1 linear | 37.8 | 106.8 | 142/150 | 32.9 | 38 | 135/147 |
| +E1 branched | 38.3 | 92.7 | 136/143 | 37 | 41.1 | 142 |
| +OH2 tri | 55.9 | 101 | 145 | 52.7 | 56.3 | 150 |
| +ENR50 E2 elastomer | 55.9 | 102.9 | 151 | 53.7 | 58.3 | 152 |
| +E3 di | 39.6 | 88.7 | 139/147 | 35.2 | 36.4 | 141/149 |
| +E4 oil | 44.8 | 90.1 | 141/149 | 44.8 | 47.6 | 146 |
| +A1 | 50 | 90.4 | 137/147 | 36 | 39.8 | 137/148 |
| +DB | 52.8 | 96.4 | 141/149 | 61.8 | 53.7 | 147 |
| +A2 | 34.6 | 87.9 | 134/146 | 34.9 | 35.7 | 135/145 |
| +E5 Si | 48 | 101.6 | 139/145 | 44.5 | 48.8 | 145/150 |
| +PEOx | 52.7 | 95.6 | 143/151 | 50.1 | 53.9 | 149 |
| +A3 VTT tall oil | 46.4 | 96 | 139/149 | 46.3 | 49.3 | 142/150 |
| +E6 VTT tall oil | 43.2 | 82.7 | 147 | 41 | 43.7 | 139/148 |
| +E7 VTT cardanol | 38.7 | 79.7 | 133/146 | 39.6 | 41.4 | 139/148 |

From the DSC results in Table 2, it can be seen that reactions between polymer-compatibilizer-cellulose have clearly occurred in materials containing epoxy functional Cardura, Epicote, Heloxy, Silikopon, Tofa epoxide and Cardanol epoxide, anhydride functional OSA and Tofa anhydride and OH-functional Arcol.

Figure 8:
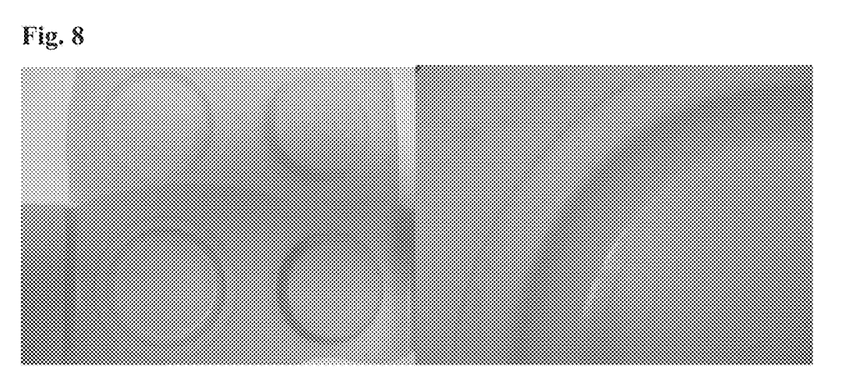
FIG. 8 shows thermally moulded items of PLA+30% birch pulp with 7.5% compatibilizers OSA (left picture upper) and Cardura (left picture lower) and a closer look to Cardura (right picture).

Results of sheet extrusion and moulding process are presented in Table 3 and FIG. 8. In addition, FIG. 7 shows a correlation of the mouldability to the strain results in a tensile strength test.

TABLE 3

Results from film extrusion and thermal mould pressing test for PLA-birch pulp composites with 7.5% or 2% compatibilizer amount and a fibre content of 30%.

|  | Succeeded sheet extrusion | Succeeded mould pressing |
| --- | --- | --- |
| PLA 2002D ref. no fibre | Yes | Yes |
| PLA + 30% Birch pulp | No | No |
| +A1 7.5% | No | No |
| +A2 7.5% | Yes, lightest sheet | Yes |
| +A3 VTT tall oil 7.5% | >1 mm sheet | Yes some cracks |
| +E1 branched 7.5% | Yes, not easy processing | Yes (best) |
| +E2 elastomer 7.5% | Yes (dark film) | Yes |
| +E3 di 7.5% | >1 mm sheet, 'hairy' | Yes some cracks |

TABLE 3-continued

Results from film extrusion and thermal mould pressing test for PLA-birch pulp composites with 7.5% or 2% compatibilizer amount and a fibre content of 30%.

|  | Succeeded sheet extrusion | Succeeded mould pressing |
|---|---|---|
| +E4 castor oil 7.5% | >1 mm sheet, difficult | No |
| +E5 Si 7.5% | >1 mm sheet | No |
| +E6 VTT tall oil 7.5% | >1 mm dark, 'hairy' sheet | Yes some cracks |
| +E7 VTT cardanol 7.5% | >1 mm dark, 'hairy' chips | No |
| +E6 VTT tall oil 2% | >1 mm 'hairy' sheet | Yes |
| +OH1 linear 7.5% | Yes | Yes some cracks |
| +OH2 tri 7.5% | >1 mm sheet, wrinkled sheet during processing | Not tested, probably yes |
| +DB 7.5% | No | No |
| +EOx 7.5% | No | No |
| +PEOx 7.5% | Difficult, dark | No |
| +GOx 2% | >1 mm 'hairy' sheet | Yes |

According to the results in FIG. 7 it seems that if the cellulose fibre containing material has clear yield strain it is at least mouldability to sheet form and in best cases mouldability in thermal pressing process. This yield strain in material can be achieved through functional compatibilizers that are able to disperse fibre properly to polymer and able to form links between fibre and polymer either through covalent or hydrogen bonds.

An example of a properly dispersed and easily mouldable material (PLA+30% BP+7.5% Cardura) can be seen in FIG. 8. Also another material (PLA+30% BP+7.5% OSA) was here found easily mouldable.

The invention claimed is:

1. A process for manufacturing a thermoformable plasticized composite from cellulose fiber and a moldable polymer comprising;
compacting dry cellulose fibers having a dry matter content ranging from 55 wt % to 99.9 wt % and one or more compatibilizers into a compressed biomaterial to form compatibilizer-containing cellulose pellets;
reacting the compatibilizer-containing cellulose pellets and a moldable polymer by compounding them into a thermoformable plasticized composite;
wherein the one or more compatibilizers comprises at least one of ≥C8 aliphatic linear or branched organic compounds containing epoxy, silicate, or hydroxyl functionalities or a silicone derivative containing epoxy, hydroxyl, or double bond functionalities, and
wherein the thermoformable plasticized composite has cross-linking by covalent bonds formed between the dry cellulose fibers and the polymer.

2. The process according to claim 1, wherein the dry cellulose fibers are obtained from wood material from softwood trees or wood material from hardwood trees or from non-wood materials, or grasses, straw, leaves, bark, seeds, hulls, flowers, vegetables or fruits.

3. The process according to claim 1, wherein the moldable polymer is selected from polylactide, polyethylene, polypropylene, polyhydroxyalkanoates, thermoplastic polyesters and polyamides.

4. The process according to claim 1, wherein the dry cellulose fibers and the moldable polymer are pressed through openings of a dry compactor 1-20 times.

5. The process according to claim 1, wherein the dry cellulose fibers and the moldable polymer are pressed through openings of a compactor more than one time, using sequential compactors.

6. The process according to claim 1, wherein compacting and densifying of the material suitable for feeding to a compounder takes place by pressing the compatibilizer-containing cellulose pellets and the moldable polymer against a perforated pan plate of a compactor with help of rollers of a roller mill.

7. The process according to claim 1, wherein the temperature of the biomaterial is increased to above room temperature during compacting, to a maximum temperature of 70° C.

8. The process according to claim 1, which is operated at a dry-matter content of above 30%.

9. The process according to claim 1, wherein the drying of the compatibilizer-containing cellulose pellets occurs in an oven at mild temperatures between 40-60° C.

10. The process according to claim 1, wherein the compounding is carried out using melt-processing, or extrusion, or injection molding, whereby the composite is in the form of a film or molded structure.

11. A thermoformable plasticized composite containing cellulose fiber and polylactide, wherein it has been manufactured using a process comprising;
blending dry cellulose fibers having a dry matter content ranging from 55 wt % to 99.9 wt % and one or more compatibilizers to form compatibilizer-containing cellulose pellets;
drying the compatibilizer-containing cellulose pellets;
reacting the compatibilizer-containing cellulose pellets and polylactide by compounding-them into a thermoformable plasticized composite,
wherein the one or more compatibilizers is selected from the group consisting of ≥C8 aliphatic linear or branched organic compounds containing epoxy, silicate, or hydroxyl functionalities or a silicone derivative containing epoxy, hydroxyl, or double bond functionalities, and
wherein the thermoformable plasticized composite has cross-linking by covalent bonds formed between the dry cellulose fibers and the polymer.

12. The process according to claim 8, wherein the dry-matter content is achieved without the use of any added solvent.

13. The process according to claim 1, wherein the one or more compatibilizers comprise a tall oil fatty acid (TOFA) anhydride, TOFA ester epoxide, a Cardanol epoxide, or a combination thereof.

14. The process according to claim 1, wherein the moldable polymer comprises polylactic acid.

15. The process according to claim 1, further comprising processing cellulose containing raw materials prior to use by refiner mechanical pulping, pressurized refiner mechanical pulping, thermomechanical pulping, groundwood, pressurized groundwood, or chemithermomechanical pulping.

16. The process according to claim 1, wherein the drying occurs at a temperature ranging from 40° C. to 60° C.

17. The process according to claim 1, wherein the process is carried out at a temperature below 200° C.

* * * * *